Patented Aug. 28, 1934

UNITED STATES PATENT OFFICE 1,971,930

PURIFICATION OF ETHER

Walter G. Christiansen, Bloomfield, and Raymond Van Winkle, Passaic, N. J., assignors to E. R. Squibb & Sons, New York, N. Y., a corporation of New York No Drawing. Application May 22, 1930, Serial No. 454,831

4 Claims. (Cl. 260—151)

Our invention relates to the treatment and packaging of ether to remove oxygen and oxidative impurities therefrom and/or to prevent the formation of oxidative impurities therein.

Ether deteriorates by reacting with oxygen to form peroxides, which in turn by interaction and/or decomposition yield aldehydes and other substances. By the term "oxidative impurities" herein we mean to designate all such peroxides, aldehydes, and related contaminating products. This deterioration increases, of course, with lapse of time, and is favored by the following circumstances: the presence, as is usual, of dissolved oxygen in the ether as ordinarily manufactured; exposure to light, particularly direct sunlight; heat, especially when in a sealed vessel; and pressure. A small proportion of these oxidative impurities suffices to render the ether unfit for anæsthetic use and otherwise diminishes its value.

It is the object of our invention to provide a method and a package whereby ether containing an excess of oxidative impurities may be purified to such a degree as to be rendered suitable for use in producing anæsthesia; and whereby oxygen may be removed from ether in order to prevent the formation of oxidative impurities therein.

In the practice of our invention we bring an adsorbent, preferably an activated carbon of vegetable or animal origin or an activated earth, into contact with the ether to be treated, preferably under anaeric conditions, the quantity of the adsorbent varying more or less directly as the quantity of ether and inversely as the period of contact. Such adsorbents, we have found, remove dissolved oxygen from ether and, even under such adverse conditions as the presence of light, heat, and pressure, maintain such ether virtually free from oxidative impurities for an indefinite period; and/or diminish the oxidative impurities in deteriorated ether to well within the limit prescribed by the United States Pharmacopeia.

As an example, we may continuously percolate ether containing an excess of oxidative impurities (as evidenced, say, by .01 cubic centimeter of active oxygen to the cubic centimeter of ether) at the rate of 50 cubic centimeters per minute through a column 40 centimeters in height and 2.5 centimeters in diameter of thoroughly dried 12-to-20-mesh granular activated carbon. Obviously, the rate of percolation depends on the height of the column, the particle size of the adsorbent, and the oxidative-impurity content of the ether.

As a further example, dissolved oxygen may be removed from ether meeting the United States Pharmacopeia standards by percolation of the liquid ether, or passage of its vapors, through a similar column under anaeric conditions, at a rate that is a function of the height of the column and the proportion of oxygen dissolved in the ether. Thus, ether containing in each cubic centimeter about .01 cubic centimeter of dissolved oxygen, may be percolated at the rate of 60 to 65 cubic centimeters a minute through a column 2.5 centimeters in diameter and 25 to 50 centimeters high of 12-to-20-mesh activated carbon.

As a still further example, we may confine about 25 grams of activated carbon with 400 grams of ether in an ordinary sealed tin container.

It will be understood that the specific details herein set forth are merely illustrative and by no means limitative of our invention, which may be variously otherwise embodied—for instance as to the particular adsorbents used, the modes of applying them to the ether, and the packages employed—within the scope of the appended claims.

We claim:

1. The process that comprises purifying ether containing a small proportion of oxygenic matter of the class consisting of oxygen and oxidative impurities by contacting the ether with an adsorbent and thus removing said oxygenic matter without removing more than a small proportion of the ether.

2. The process that comprises purifying ether containing a small proportion of oxygenic matter of the class consisting of oxygen and oxidative impurities by contacting the ether with an activated carbon and thus removing said oxygenic matter without removing more than a small proportion of the ether.

3. The process that comprises purifying ether containing a small proportion of oxygenic matter of the class consisting of oxygen and oxidative impurities by anaerically contacting the ether with an adsorbent and thus removing said oxygenic matter without removing more than a small proportion of the ether.

4. The process that comprises purifying ether containing a small proportion of oxygenic matter of the class consisting of oxygen and oxidative impurities by anaerically contacting the ether with an activated carbon and thus removing said oxygenic matter without removing more than a small proportion of the ether.

WALTER G. CHRISTIANSEN.
RAYMOND VAN WINKLE.